3,689,300
COUPLING AGENT FORMULATIONS
Fred Lee Bunger and Michael Levitsky, Wilmington, Del., assignors to E. I. du Pont de Nemours and Company, Wilmington, Del.
No Drawing. Continuation-in-part of application Ser. No. 11,773, Feb. 16, 1970. This application Jan. 26, 1971, Ser. No. 109,968
Int. Cl. C09r 3/00
U.S. Cl. 106—287    8 Claims

ABSTRACT OF THE DISCLOSURE

Coupling agent formulations comprising metal oxide coated colloidal silica sols and organofunctional silanes; and reinforcing filler materials coated with such formulations.

CROSS REFERENCE TO RELATED APPLICATION

This application is a continuation-in-part of U.S. application Ser. No. 11,773 filed Feb. 16, 1970 now abandoned.

BACKGROUND OF THE INVENTION

Coupling agents have traditionally been applied to reinforcing materials which are to be laminated with a plastic. These coupling agents enhance the strength of the laminates. It is generally recognized that the performance of a coupling agent has a direct bearing on the strength of a laminate. Therefore, the development of new, more effective coupling agents is of paramount importance to the plastic industry.

This invention is directed toward coupling agent formulations comprising metal oxide coated colloidal silica sols and organofunctional silanes as its two essential components; and reinforcing fillers coated with such formulations.

Certain organofunctional silane complexes are well known in the plastic forming arts as excellent coupling agents for bonding organic impregnating resins to reinforcing filler materials.

The reinforcing filler materials used in the laminating arts can be treated with coupling agent formulations during or subsequent to their manufacture.

Coupling agent formulations have traditionally been applied to reinforcing filler materials as either a "finish" or a "size." A finish solution usually contains only a coupling agent formulation and an appropriate solvent. Such finishing solutions are usually applied to woven goods and are the preferred type of reinforcing material where maximum strength laminates are desired or required.

A more economic and convenient method for applying the coupling agent to reinforcing filler materials is the treatment of such materials with a size containing the coupling agents as an integral step in their manufacture. The sizing solution, containing both coupling agents and other processing additives, is applied to the reinforcing filler materials by spraying or padding techniques. Because the size is intended to perform a plurality of functions (for instance, bond multifilamentous glass fibriles into coherent strands, protect such materials from self-abrasion and chemical degradation during handling and weaving, and couple the reinforcing materials to the organic impregnating resins), it can contain, and often does, several components in addition to coupling agents. The classical sizing solution for glass fibers will routinely contain organic resinous bonding agents, lubricants, anti-static agents, emulsifiers, and coupling agents.

Unfortunately, the effectiveness of the coupling agent is somewhat offset by the presence of the other size components. Apparently the various components of the size randomly coat reinforcing filler material, leaving some sections of the materials devoid of coupling agents and therefore causing incomplete bonding of the reinforcing filler to the impregnating resin.

We have discovered that the addition of a positively charged sol to a solution containing a conventional organofunctional silane coupling agent substantially enhances the wetting of the reinforcing filler materials with impregnating resins and also substantially reduces the amount of silane needed in such a formulation to achieve comparable or superior results. Use of the coupling agent formulation of this invention improves the strength of the reinforcing filler-resin laminates, and provides laminates of greater translucence than conventional coupling agents.

SUMMARY OF INVENTION

In summary, this invention pertains to coupling agent formulations comprising positively charged sols and organofunctional silanes.

Positively charged sols consist of colloidal silica particles ranging in size from about 2 to 100 millimicrons. The particles have a dense silica core coated with a polyvalent metal-oxygen compound. Typical polyvalent metals employed in these sols are aluminum, chromium, titanium, or zirconium. These sols are stable on the acid side and have a high positive charge as opposed to the more traditional silica sols which are negatively charged and stable primarily on the basic side. These sols contain from 5 to 50% solids by weight. Positively charged coated colloidal silica sols having water as the solvent are describved in detail in U.S. Pat. 3,007,878, to Alexander and Bolt. Sols having solvents other than water such as hydroxy-substituted alkyls of 1 to 6 carbon atoms may also be used.

The organofunctional silane compounds of this formulation have the general formula $$R_n\text{—Si—}X_{(4-n)}$$

wherein

R is selected from the group consisting of alkenyl of 1 to 18 carbon atoms, alkyl of 1 to 18 carbon atoms, alkenylcarboxyalkyl of 1 to 18 carbon atoms, amino alkyl of 1 to 18 carbon atoms, thioalkyl of 1 to 18 carbon atoms, and epoxy substituted alkyl of 1 to 18 carbon atoms;

X is selected from the group consisting of halogen, hydroxy, alkoxy of 1 to 6 carbon atoms, aryloxy of 6 to 10 carbon atoms, and amino;

n is a positive integer from 1 to 3.

DESCRIPTION OF THE PREFERRED EMBODIMENTS

This invention is specifically directed toward coupling agent formulations comprising solutions of a positively charged aquasol and an organofunctional silane. Formulations of this invention can be incorporated into size and finish solutions which may or may not include other processing additives, notably, organic resinous bonding agents, lubricants, anti-static agents, and emulsifiers.

The sizing and finishing solutions are useful in preparing reinforcement filler materials for bonding to organic impregnating resins.

The relative weight ratio of organofunctional silane to positively charged aquasol in the coupling agent formulations of this invention are not critical but as a practical matter will range from 1:6 to 30:1. Preferably, the relative weight ratio will range from 1:3 to 10:1. However, the weight ratios of the respective components of the composition will change upon their being combined because positively charged silica sol and organofunctional silane partially react to form a third, as yet unidentified, species of compound.

Diminution in the concentration of organofunctional silane by the limited addition or substitution of less expensive metal oxide coated silica sols will not result in a sacrifice of bonding strength. Substitution of 10 to 70% of the organofunctional silanes of conventional coupling agent formulation with a metal oxide coated silica sols will yield comparable, and in some instances improved, bonding strengths. The observation of comparable or superior bonding capacity is believed to be attributable to a synergism between the two components; the positively charged colloidal silica sols having a greater affinity for the reinforcement materials (most reinforcement materials being negatively charged), than silane alone and therefore causing more complete wetting of such materials with impregnating resins. The observation of synergism is especially evident where the reinforcing materials are "low sodium" glasses.

Formulations having a ratio of a 30% solids positive aquasol to silane of about 3 are preferred for the formulations of this invention both from the standpoint of economics and performance.

COUPLING AGENT FORMULATION COMPONENTS

The positively charged sols of this invention preferably are aquasols of positively charged colloidal particles consisting of a dense silica core coated with a polyvalent metal-oxygen compound of the class consisting of metal oxides, hydroxides, and hydrated oxides. The pH of the sols useful in this invention ranges from about 2.5 to 7. Outside of this range the sols tend to be unstable. The negatively charged colloidal silica is coated with a sufficient amount of the metal-oxygen compound to impart a positive charge on the resulting colloidal metal-oxygen compound-silica reaction product. The metals useful for preparing these sols have a valence of 3 to 4. Examples are aluminum, chrominum, titanium, and zirconium. These sols are described in Alexander and Bolt, U.S. Pat. 3,007,878. These aquasols are acidic, have a particle diameter from 2 to 100 millimicrons and are from 5 to 50% solid. Alumina coated silica aquasols are preferred in the formulations of this invention. Other useful solvents are hydroxy-substituted alkyls of 1 to 6 carbon atoms.

The organofunctional silane compounds useful in this invention are coupling agents for glass-plastic composites and have the general formula $$R_n\text{—Si—}X_{(4-n)}$$

wherein

R is selected from the group consisting of alkenyl of 1 to 18 carbon atoms, alkyl of 1 to 18 carbon atoms, aminoalkyl of 1 to 18 carbon atoms, thioalkyl of 1 to 18 carbon atoms, alkenylcarboxyalkyl of 1 to 18 carbon atoms, and epoxy substituted alkyl of 1 to 18 carbon atoms;

X is selected from the group consisting of hydroxy, halogen, alkoxy of 1 to 6 carbon atoms, aryloxy of 6 to 10 carbon atoms, and amino;

$n$ is a positive integer from 1 to 3.

Organofunctional silane selection is based on the readiness of the organofunctional silane to promote adhesion between filler and the specific resin. For example, gamma-methacryloxypropyltrimethoxy-silane is one of the preferred coupling agents for glass-polyester laminates. A gamma-aminopropyltriethoxysilane agent coupling gives strong epoxy glass laminates but gives inferior polyester glass laminates. The general approach for selection of organofunctional silane is to match the organic portion of the molecule to the resin being used in the laminate.

The preferred organofunctional silane is these coupling agent formulations are gamma-methacryloxytrimethoxysilanes,

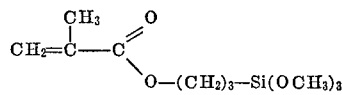

gamma-aminopropyltriethoxysilane, $$H_2N\text{—}(CH_2)_3\text{—}Si(OC_2H_5)_3$$

vinyl-tris(2-methoxyethoxy) silane, $$CH_2\text{=}CH\text{—}Si(OC_2H_4OCH_3)_3$$

gamma-glycidoxypropyltrimethoxysilane,

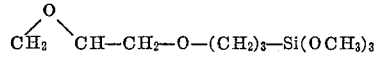

and beta-(3,4-epoxycyclohexyl) ethyltrimethoxysilane

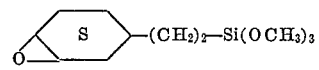

Additives which have been traditionally added to sizes or finishes can also be used in conjunction with the coupling agent formulations of this invention to make size and finish compositions. The primary purpose of these additives is not related to coupling the reinforcing materials to the impregnating resins but rather to the processing and handling of the reinforced materials themeselves.

The various components of the coupling agent formulations are combined by adding them to an aqueous or a polar organic solvent. The selection of an appropriate solvent will depend upon relative solubility of all the various components in the formulation and the type of materials being sized or finished. The organofunctional silane concentration of the coupling agent formulation can range from 0.05 to 10.0 parts by weight of silane to each 100 parts by weight solvent. As noted earlier the organo functional silanes and metal oxide coated silica sols partially react when combined to form a third, as yet unidentified, compound. After initial reaction between the two essential components to form the third component, the solution remains quite stable and has a relatively long pot life.

The coupling agent formulations of this invention can be incorporated into a size in place of the silane alone and applied to the reinforcing filler materials by any of the conventional sizing techniques.

The coupling agent formulation can also be applied in a finish to woven materials where it may be the only functional component present.

After coating of the reinforcing filler materials with a sizing or finishing solution the coated materials are heat cured for a period of from a few minutes to several hours depending on the temperature. The preferred drying temperatures will range from between 50 to 180° C. In general the time required to complete polymerization of the composition will vary inversely from the temperature.

A typical reinforcing material is a substance which when incorporated into and coupled to the organic resins of this invention enhances the strength and stiffness of the cured plastic. The reinforcement materials of this invention can be in the form of rovings, fabrics, continuous and chopped-strand mat, chopped strands and milled fibers. Among the reinforcing materials used in the laminate forming arts are fibers of pure fused silica, refractory alumino-silicate, glass fibers, rock wool fibers, asbestos, sisal, cotton, quartz, glass microspheres, graphite and boron fibers and metal whiskers.

As is evident from the previous list of common reinforcing materials many of the substances are quite distinct in their physical characteristics (density, surface area and porosity). The physical characteristics of the reinforcement materials will determine the amount of coupling agent formulation adsorbed or absorbed and therefore the relative strength of the bond between the coupling agent and the reinforcement materials. The amount of coupling agent actually present on the reinforcing materials can be controlled by regulating the wet weight pickup, the concentration of the essential components in the formulation, and by controlling the amount of surface area of the reinforcement material. Generally, the desired concentration of the essential components of the coupling agent formulation on the reinforcing materials exceed 0.25 to 10.0% of the weight of the reinforcing materials. Low surface area and low porosity materials, such as glass fibers, pick up relatively low amounts of these coupling agent formulations.

Non-reinforcing filler materials can also be incorporated into the resinous composites formed with the coupling agent formulations of this invention, either for reasons of economics (substitution of cheaper materials for expensive resins) or to impart color or other properties to be plastic.

Among the more common of the non-reinforcing filler materials which can be used are kaolin, talc, mica, chrysotile asbestos, alumina, zircon, zirconia, magnesium oxide, colloidal amorphous silica, attapulgite, wollastonite, pearlite, flyash, calcium silicate, synthetic fillers and fibers, and in general any particulate refractory material.

The aounts of reinforcing filler materials which can be incorporated into a resinous composite can vary from as little as 1 to as much as 90% by weight of the total composition; depending on the relative density of the resin and the reinforcing materials and the method of fabrication. For example, filament glass fiber structures can be prepared having extremely high loadings of glass relative to resin. The concentration of reinforcing fillers in the majority of the composites will range from 10 to 70% by weight of the total resin composite.

The organic impregnating resins, as distinguished from the resinous bonding agents of the sizing formulations, are liquid, semi-solid or solid materials produced by union (polymerization or condensation) of a large number of molecules of one, two, or less frequently three relatively simple compounds. The term "resin" as used herein embraces both the synthetic and chemically modified natural resins. The resinous materials of this invention are generally classified as thermoplastic (resins which soften upon heating and reset upon cooling) or thermosetting (resins which set or harden upon heating). These plastics generally have low physical strengths. Strengths are improved by forming composites with inert fillers.

Thermoplastic resins which can be used to prepare composites with inert fillers and the coupling agent compositions of this invention include polycarbonamide resins, thermoplastic polyester resins, polyglycoldimethylterephthalate, polyacrylonitrile, linear and low density polyethylene, polypropylene, polybutadiene, polycarbonate, polyphenylene oxide, polysulfone, polyvinyl chloride, polystyrene and polyurethane.

Composites containing thermoplastics are prepared by heating the thermoplastic and causing the thermoplastic to flow, thus the filler or reinforcing material is wetted. The hot composite is cooled and the composite becomes stiff. If a thermoplastic composite is heated to the softening points of the polymer, the composite will be soft.

Thermosetting resins which can be used to make laminated compositions with the coupling agent formulations of this invention include polyester resins which are crosslinkable through vinyl unsaturation, such as maleic acid-glycol copolymers and combinations of these with styrene, epoxy resins, phenol-formaldehyde, ureaformaldehyde, melamine formaldehyde, polyimide resins, acrylic and methacrylate resins. The uncured thermosetting plastic syrup and the filler or reinforcing material are combined and the mixture is heat cured. The resulting laminate becomes hard at the curing temperature.

Treated reinforced materials of this invention may be used to reinforce various elastomers such as natural rubber, oil extended rubber and a variety of butadiene, styrene, acrylonitrile, and polyacrylate modifications of synthetic and natural rubber.

The selection of the plastic for a composite depends upon the end use of the composite. That is no one plastic is used for all applications. Glass filled polyethylene offers inexpensive composites. Epoxy laminates are highly chemical resistant. Polyimide laminates can be used for high temperature application.

The examples which follow are only illustrative of only a few of the possible embodiments of this invention. Parts and percentages are by weight unless otherwise specified.

EXAMPLE 1

Methacryloxypropyltriethoxysilane and a 30 weight percent aqueous alumina modified silica sol were added to 100 parts of water and this solution was stirred for one hour at a pH of 4.7. The alumina modified silica sol, prepared by mixing an aqueous solution of basic aluminum chloride with an aqueous silica sol, heating the mixture at 70° C. for 1 hour, and then adding magnesium oxide to raise the pH of the resulting sol to 4.4, contained 26% $SiO_2$, 4% $Al_2O_3$, 1.4% Cl, and 0.2% MgO, and had an approximate particle diameter of 16 millimicrons. The total of the silane and alumina modified silica sol was 2 parts. The ratio of alumina modified silica sol used per mole of silane is given in Table I. The water also contained 4 parts of a 55% aqueous emulsion of a polyvinyl acetate (Elvacet 81–900, manufacture by E. I. du Pont de Nemours and Company of Wilmington, Del.) and 0.1 part of a lubricant (Cirrasol 220 purchased from ICI America Inc., Stamford, Conn.). The coupling agent formulation was prepared by adding the respective components to the solvent sequentially, the particular order being unimportant.

Heat cleaned glass cloth was dipped into the coupling agent solution and after wringing out was dried in an oven. After cutting to proper length and width, the treated glass was ready for laminate fabrication.

A 1/8 inch thick 12-ply laminate was prepared by placing a piece of the treated fabric on a puddle of polyester resin consisting of 1 mole of phthalic anhydride, 1 mole of maleic anhydride and 2.2 moles of propylene glycol esterified to an acid number of between 30 and 45. A polyester resin of this description is available under the trade name of "Paraplex" P–43 manufactured by Rohm and Haas of Philadelphia. One hundred parts of the polyester resin was catalyzed with 1 part of benzoyl peroxide. After the fabric had become wet by wicking the resin, an additional quantity of resin was poured on top of the fabric layer and another piece of fabric was added. This procedure is repeated until the laminate had 12 thicknesses of glass fabric. The laminate is covered with cellophane and the excess resin and air was removed by squeegeeing the laminate.

After heat curing under pressure the laminate was cut into test specimens. The test specimens are tested for flexural dry strength and short-term flexural wet strength after 2 hours in boiling water. The results are tabulated below in Table I.

TABLE I

| Ratio[1] | Flexural strength ($10^3$ p.s.i.) | |
|---|---|---|
| | Dry | 2 hr. boil |
| 0 | 79.3 | 71.4 |
| 0.008 | 81.9 | 73.7 |
| 0.015 | 83.8 | 75.2 |
| 0.06 | 84.9 | 76.1 |
| 0.15 | 84.0 | 75.5 |
| 0.3 | 77.7 | 67.2 |
| 0.6 | 75.6 | 59.0 |
| 0 | 75.0 | 41.2 |

[1] Alumina coated silica sol (parts), Silane (parts).

EXAMPLE 2

Heat cleaned glass rovings are treated with a solution containing X parts of hydrolyzed methacryloxypropyltriethoxysilane and Y parts of the alumina coated silica sol of Example 1. The solution contains 2% of a 55% aqueous emulsion of polyvinyl acetate and 0.1% of a lubricant. The rovings are wrung out and dried in an oven. The treated rovings are cut into 30 inch pieces and 6 grams of the roving sections are tied in the middle with a copper wire. These glass rovings are soaked in a polyester resin solution containing 1.5 parts of benzoyl peroxide, 15 parts of styrene and 135 parts of polyester resin. The soaked glass rovings are drawn into a 4 mm. glass tube and oven cured. The rod laminates are removed from the glass tubes and cut into test specimens and tested for flexural dry strength and short term flexural wet strength after 2 hours in boiling water. The results are tabulated below in Table II.

TABLE II

| X parts silane | Y parts[1] | Flexural strength (10³ p.s.i.) | |
|---|---|---|---|
| | | Dry | 2 hr. boil |
| 0.25 | 0 | 179 | 145 |
| | 0.25 | 194 | 161 |
| 0.10 | 0.40 | 187 | 158 |
| 0.50 | 0 | 178 | 159 |

[1] Alumina coated silica sol of Example 1.

The results of this testing shows that the silane concentration can be cut in five fold by substituting an equal amount of alumina coated silica sol for a given level of strength after 2 hours boiling.

EXAMPLE 3

Three different alumina coated positive sols with surface silica to alumina mole ratios of 1:2, 1:1, and 2:1, were prepared and used in turn with the coupling agent solution as described in Example 2. The solution was applied to glass rovings as described in Example 2. These glass rovings were used to prepare polyester rod laminates. All three of these different positive sols gave polyester glass rod laminates of comparable strengths.

| Surface silica: aluminum | Flexural strength (10³ p.s.i.) | |
|---|---|---|
| | Dry | 2 hr. boil |
| 1:2 | 178 | 166 |
| 1:1 | 182 | 154 |
| 2:1 | 188 | 160 |

EXAMPLE 4

The starting materials for the preparation of the positive sols described in Example 3 were added to the coupling agent bath described in Example 2. The starting materials for the positive sols are basic aluminum chloride and colloidal silica sols. The polyester glass laminates prepared from rovings treated with a coupling agent solution containing the starting materials, a hydrolyzed organofunctional silane, polyvinyl acetate, and lubricant were not as strong as the laminates prepared with alumina coated silica sol, the organofunctional silane, polyvinyl acetate, and lubricant.

EXAMPLE 5

Heat cleaned glass treated with a coupling agent solution containing gamma-aminopropyltriethoxysilane, polyvinyl acetate, lubricant and positive sol. This treated glass cloth is used to prepare an epoxy laminate. The epoxy resin is a reaction product of epichlorohydrin and bisphenol-A and a curing agent of metha-phenylenediamine is used. After exposure to boiling water for 72 hours, the laminates prepared from the coupling agent solution containing the alumina coated silica sol are much stronger than the laminates prepared from the same coupling agent solution but with the alumina coated silica sol deleted from the coupling agent solution.

EXAMPLE 6

As in Example 2 the amount of silane to give a desired level of reinforcement can be cut by 50% when positive sol is added to the coupling agent solution and when vinyltrimethoxysilane is substituted for gamma-methacryloxypropyltrimethoxysilane.

| Positive sol (percent)[1] | Vinyl silane (percent)[1] | Flexural strength (10³ p.s.i.) | |
|---|---|---|---|
| | | Dry | 2 hour boil |
| | 0.1 | 182 | 151 |
| 0.1 | 0.1 | 182 | 147 |
| | 0.2 | 183 | 151 |

[1] Size bath concentration.

EXAMPLE 7

Glass filled polyethylene is made stronger by adding to the coupling agent solution a small amount of positive sol. Aside from the solvent and the alumina coated silica sol, the major constituent in the coupling agent solution is a polymeric silane. Besides enhanced strength after exposure to boiling water, the coupling agent solution with the alumina coated silica sol imparts further properties to the glass which are advantageous in the formation of glass filled polyethylene. The glass with the alumina coated silica sol coating allows easier formation of the glass filled polyethylene, that is, there is faster wet-out of the glass fibers and a lower working temperature. A similar effect is observed by reinforcing polyvinyl chloride with alumina coated silica sol treated glass.

EXAMPLE 8

Asbestos treated with the coupling agent solution described in Example 1 and with an aluminum to silane ratio of .2 gave a treated asbestos product which is easily dispersed in polyester resin. When the alumina coated silica sol is deleted from the coupling agent solution the asbestos does not disperse as easily in the polyester resin. Laminates prepared from polyester resin and the treated asbestos gave strong laminates. The asbestos treated with alumina coated silica sol containing solution give the stronger laminate.

EXAMPLES 9–15

The following examples are to demonstrate the wide utility of a silane-alumina coated silica sol coupling agent over the use of just a silane. In all of these examples the coupling agent solution containing both silane and alumina coated silica sol gives stronger composites than the coupling agent solutions containing just silane. In addition to the stronger laminates obtained from this system, the materials coated with the coupling compositions containing alumina coated silica sol are easier to process and give composites of higher clarity. The reinforcing agent and resins are given below in the table.

TABLE III

| Example | Reinforcing agent | Resin |
|---|---|---|
| 9 | Glass microspheres | Polypropylene. |
| 10 | Mica | Polyester. |
| 11 | do | Polyimide. |
| 12 | Graphite fibers | Epoxy. |
| 13 | Glass rovings | Polystyrene. |
| 14 | Glass cloth | Polycarbonate. |
| 15 | Cotton | Urea formaldehyde. |

We claim:
1. A coupling agent formulation for imparting improved strength to reinforcing filler-resin laminates consisting essentially of an organofunctional silane of the formula

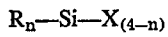

wherein

R is selected from the group consisting of alkyl of 1 to 18 carbon atoms, alkenyl of 1 to 18 carbon atoms, alkenylcarboxyalkyl of 1 to 18 carbon atoms, aminoalkyl of 1 to 18 carbon atoms, thioalkyl of 1 to 18 carbon atoms and epoxy substituted alkyl of 1 to 18 carbon atoms;

X is selected from the group consisting of hydroxy, halogen, alkoxy of 1 to 6 carbon atoms, aryloxy of 6 to 10 carbon atoms, and amino;

$n$ is a positive integer of 1 to 3; and a positive charged sol consisting of colloidal particles having a dense silica core coated with a polyvalent metal-oxygen compound, selected from the group consisting of oxides, hydroxides and hydrated oxides of metals having a valance of 3 to 4, the particles having a particle diameter of from 2 to 100 millimicrons and the sol having a solids content of from 5 to 10% by weight.

2. The coupling agent formulation of claim 1 wherein the positively charged sol is an aquasol having an organofunctional silane to positively charged aquasol solids weight ratio of from 1:6 to 30:1.

3. The coupling agent formulation of claim 2 having an organofunctional silane to positively charged aquasol solids weight ratio of from 1:3 to 10:1.

4. The coupling agent formulation of claim 2 wherein the organofunctional silane is selected from the group consisting of gamma-glycidoxypropyltrimethoxysilane,
gamma-methacryloxypropyltrimethoxysilane,
vinyltriethoxysilane,
gamma-glycidoxypropyltrimethoxysilane,
beta-(3,4-epoxycyclohexyl)ethyltrimethoxysilane and
vinyltris(2-methoxy)silane;

and the positively charged aquasol is an alumina coated colloidal silica sol.

5. A sized reinforcement material coated with 0.01 to 20.0% by weight of the dried coupling agent formulation of claim 1.

6. A fiberglass aqueous size composition containing the coupling agent formulation of claim 2.

7. A fiberglass finish composition containing the coupling agent formulation of claim 2.

8. A sized reinforcement material coated with the coupling agent formulation of claim 2.

References Cited
UNITED STATES PATENTS

| | | | |
|---|---|---|---|
| 3,312,569 | 4/1967 | Philipps et al. | 117—126 |
| 3,139,406 | 6/1964 | Mindick et al. | 252—313 |
| 2,915,475 | 12/1959 | Bugosh | 106—286 X |

THEODORE MORRIS, Primary Examiner

U.S. Cl. X.R.

106—308 B; 117—126 GQ

PO-1050
(5/69)

UNITED STATES PATENT OFFICE
CERTIFICATE OF CORRECTION

Patent No. 3,689,300                Dated September 5, 1972

Inventor(s) Fred Lee Bunger and Michael Levitsky

It is certified that error appears in the above-identified patent and that said Letters Patent are hereby corrected as shown below:

Column 9, line 24, "10%" should be -- 50% --.

Signed and sealed this 9th day of April 1974.

(SEAL)
Attest:

EDWARD M. FLETCHER, JR.
Attesting Officer

C. MARSHALL DANN
Commissioner of Patents